United States Patent
Chen et al.

(10) Patent No.: US 12,043,340 B2
(45) Date of Patent: Jul. 23, 2024

(54) BICYCLE TOWING DEVICE

(71) Applicant: Yuxuan Chen, Dongguan (CN)

(72) Inventors: Yuxuan Chen, Dongguan (CN); Jiaxin Chen, Dongguan (CN); Yunwei Xu, Dongguan (CN)

(73) Assignee: Yuxuan Chen, Guangdong (CN)

( * ) Notice: Subject to any disclaimer, the term of this patent is extended or adjusted under 35 U.S.C. 154(b) by 220 days.

(21) Appl. No.: 17/762,935

(22) PCT Filed: Jun. 15, 2021

(86) PCT No.: PCT/CN2021/100078
§ 371 (c)(1),
(2) Date: Mar. 23, 2022

(87) PCT Pub. No.: WO2022/188284
PCT Pub. Date: Sep. 15, 2022

(65) Prior Publication Data
US 2023/0076837 A1    Mar. 9, 2023

(30) Foreign Application Priority Data

Mar. 12, 2021   (CN) .......................... 202110268698.5

(51) Int. Cl.
*B62K 27/12*        (2006.01)
(52) U.S. Cl.
CPC .................................. *B62K 27/12* (2013.01)
(58) Field of Classification Search
CPC .................................................... B62K 27/12
See application file for complete search history.

(56) References Cited

U.S. PATENT DOCUMENTS

| | | | | |
|---|---|---|---|---|
| 6,155,582 A | * | 12/2000 | Bourbeau | B62K 27/12 |
| | | | | 280/239 |
| 8,882,123 B1 | * | 11/2014 | Gingras | B62K 27/12 |
| | | | | 280/402 |

(Continued)

FOREIGN PATENT DOCUMENTS

| | | | |
|---|---|---|---|
| CN | 109895922 A | * | 6/2019 |
| CN | 109895922 A | | 6/2019 |

(Continued)

OTHER PUBLICATIONS

International Search Report and Written Opinion pertaining to PCT/CN2021/100078, pp. 1-5.

*Primary Examiner* — Minnah L Seoh
*Assistant Examiner* — Hosam Shabara
(74) *Attorney, Agent, or Firm* — GRUMBLES LAW PLLC; Brittany Haanan

(57) ABSTRACT

The present disclosure discloses a bicycle towing device, which comprises a folding connecting frame and a small bicycle connecting frame, wherein the front end of the folding connecting frame is clamped to the rear connecting shaft of a big bicycle and locked and positioned by a fastening component, the rear end of the folding connecting frame is connected with a hook at the front end of the small bicycle connecting frame, the rear end of the small bicycle connecting frame is clamped and connected to the small bicycle frame, the front wheel of the small bicycle is lapped on the folding connecting frame and positioned motionless without contacting with the ground during connection, the folding connecting frame is provided with a rotating shaft, and the rotating shaft is located between the rear wheel of the big bicycle and the front wheel of the small bicycle.

6 Claims, 4 Drawing Sheets

(56) References Cited

U.S. PATENT DOCUMENTS

| | | | |
|---|---|---|---|
| 9,174,699 B2* | 11/2015 | Lee | B62K 27/12 |
| 9,725,126 B2* | 8/2017 | Yeh | B62K 27/12 |
| 2006/0066075 A1* | 3/2006 | Zlotkowski | B60P 3/125 |
| | | | 280/402 |
| 2012/0205892 A1* | 8/2012 | Peruzzo | B62K 27/12 |
| | | | 280/292 |

FOREIGN PATENT DOCUMENTS

| | | | | |
|---|---|---|---|---|
| CN | 112776931 A | | 5/2021 | |
| DE | 3913075 C2 | | 1/1995 | |
| GB | 2609263 A | * | 2/2023 | B62K 27/003 |
| WO | WO-2006027402 A1 | * | 3/2006 | B62K 13/02 |

* cited by examiner

BICYCLE TOWING DEVICE

CROSS REFERENCE TO RELATED APPLICATION(S)

This patent application claims the benefit and priority of Chinese Patent Application No. 202110268698.5, filed on Mar. 12, 2021, the disclosure of which is incorporated by reference herein in its entirety as part of the present application.

TECHNICAL FIELD

The present disclosure relates to the field of a bicycle moving auxiliary device, in particular to a bicycle towing device.

BACKGROUND ART

At present, when adults need to take minors to ride outdoors, they usually need to connect two independent bicycles to ensure the safety of minors riding in dangerous places such as roads. At present, the common connection mode in the market uses the arc-shaped connecting rod to fix the supporting rod of the seat part of the big bicycle for adults and the front part of the small bicycle for minors, so as to realize the function of connecting and towing. This connection method has the following problems.

1) When the big bicycle turns, the turning point of the small bicycle is also at the front of the big bicycle, so that the whole turning radius of the small bicycle is about equal to the original turning radius of the big bicycle plus the length of the connecting rod and the length of the small bicycle, and the turning radius increases, which leads to the increased danger when turning during riding (more turning places are needed, for example, after the big bicycle turns to pass, the small bicycle needs to turn by means of the side lane, which increases the risk of the small bicycle).
2) The connecting rod must be connected to the connecting rod under the seat of the big bicycle. For some bicycles, the connecting rod under the seat is not located enough, or when adults do not need such a high seat, they cannot provide enough connecting space. In this case, they cannot be used.
3) After arriving at the destination, after the small bicycle is separated from the big bicycle, the connecting rod of the big bicycle cannot be retracted, which leads to a connecting rod being dragged behind the big bicycle, increasing the danger behind the big bicycle.
4) The small bicycle needs the front of the bicycle to be firmly fixed so that the front of the bicycle cannot touch the ground, and needs to be fastened and connected by a complicated connection method. Special tools are needed for separation, and disassembly is inconvenient.
5) After using the above connecting rod, the rear seat of the big bicycle can no longer carry goods or people, which limits the normal use function of the big bicycle.

SUMMARY

The purpose of the present disclosure is to provide a bicycle towing device, provide a connection mode with more convenient disassembly, safety and richer functions, and solve the problems listed in the background art.

To solve the above technical problems, the present disclosure adopts the following technical scheme.

The present disclosure relates to a bicycle towing device, comprising a folding connecting frame and a small bicycle connecting frame, wherein the front end of the folding connecting frame is clamped to the rear connecting shaft of a big bicycle and locked and positioned by a fastening component, the rear end of the folding connecting frame is connected with a hook at the front end of the small bicycle connecting frame, the rear end of the small bicycle connecting frame is clamped and connected to the small bicycle frame, the front wheel of the small bicycle is lapped on the folding connecting frame and positioned motionless without contacting with the ground during connection, the folding connecting frame is provided with a rotating shaft, the rotating shaft is located between the rear wheel of the big bicycle and the front wheel of the small bicycle, and the folding connecting frame is fully unfolded when in operation, and is folded when not in operation.

Further, the folding connecting frame comprises a front bicycle positioning connecting frame, an intermediate connecting frame and a rear support connecting rod, the front end of the front bicycle positioning connecting frame is connected with the rear connecting shaft of the big bicycle, the bottom of the rear end of the front bicycle positioning connecting frame is hinged with the front end of the intermediate connecting frame through a lower adapter plate and a first hinge member, the rear end of the intermediate connecting frame is connected with one end of the rear support connecting rod through a rear adapter plate and a third hinge member, the other end of the rear support connecting rod is welded with a hooking ring, the middle of the intermediate connecting frame is connected with a supporting frame, one end of the supporting frame is hinged on the intermediate connecting frame through a collar and a second hinge member, and the other end of the supporting frame is connected to the top of the rear end of the front bicycle positioning connecting frame through an upper adapter plate.

Still further, one end of the lower adapter plate is connected to the bottom of the rear end of the front bicycle positioning connecting frame through a fastening bolt and a fastening nut, the first hinge member penetrates into the round hole at the other end of the lower adapter plate, one end of the upper adapter plate is connected to the top of the rear end of the front bicycle positioning connecting frame through a fastening bolt and a fastening nut, the top end of the supporting frame is connected to the other end of the upper adapter plate through a connecting screw, the collar is sleeved on the intermediate connecting frame, the top of the collar is hinged with the bottom of the supporting frame through the second hinge member, one end of the rear adapter plate is connected with the bottom of the rear support connecting rod through a bolt component, the other end of the rear adapter plate is welded to the third hinge member, and both ends of the third hinge member are locked and hinged to the rear end of the intermediate connecting frame through a nut.

Still further, the front end of the front bicycle positioning connecting frame is provided with an L-shaped clamping arm, the joint of the clamping arm is provided with a U-shaped clamping interface, and the U-shaped clamping interface is clamped to the rear connecting shaft of the big bicycle.

Still further, the small bicycle connecting frame comprises two symmetrically arranged connecting mainboards, the hooks are provided at the front end of the connecting mainboards, the two connecting mainboards are fastened by locking rings after being buckled on the small bicycle frame, the locking rings are sleeved outside the connecting mainboards, the hooks are connected with the hooking rings; when being connected, the front wheel of the small bicycle is embedded on the intermediate connecting frame, the rear side of the front wheel of the small bicycle is lapped on the third hinge member, and the front side of the front wheel of the small bicycle is lapped on the vertical connecting rod at the front end of the intermediate connecting frame.

Still further, the locking ring is made of an elastic material and into an elastic ring, or is directly locked and positioned by a binding band with a quick clip.

Still further, the fastening component comprises a special-shaped nut, a bowl-shaped washer and an inner washer, bowl-shaped washers are symmetrically arranged on both sides of the U-shaped clamping interface, the inner washer is installed inside the inner bowl-shaped washer, and the special-shaped nut is installed outside the outer bowl-shaped washer and locked on the rear connecting shaft of the big bicycle.

Compared with the prior art, the present disclosure has the following beneficial technical effects.

The present disclosure relates to a bicycle towing device, which comprise a folding connecting frame and a small bicycle connecting frame which are hooked together. When in operation, the folding connecting frame is in an unfolded state, the front end of the folding connecting frame is clamped to the rear connecting shaft of the big bicycle and locked and positioned by a fastening component, and the rear end of the small bicycle connecting frame is clamped and connected to the small bicycle frame. The folding connecting frame is folded when not in operation. The folding connecting frame comprises a front bicycle positioning connecting frame, an intermediate connecting frame, a rear supporting connecting rod and a supporting frame for positioning, wherein the frame bodies are rotatably connected together by a plurality of hinge members. One end for fixing is fastened and installed by a bolt component which is convenient to disassemble, so that it is convenient and quick to use, and it is convenient to install and disassemble.

1) When the present disclosure is used, the folding connecting frame is connected with the rear connecting shaft of the big bicycle, the wheels of the small bicycle are supported by the intermediate connecting frame. The connecting motherboard is fastened by the locking ring after being buckled on the small bicycle frame. The joint between the intermediate connecting frame and the front bicycle positioning connecting frame can not only realize folding operation, but also rotate around coaxial fastening screws. That is, the rotating shaft of the small bicycle is designed in front of the wheels of the small bicycle, which greatly reduces the turning radius.

2) The connecting point of the folding connecting frame is at the rear connecting shaft of the big bicycle, and there is no restriction on the structure and height of the seat of the big bicycle.

3) The small bicycle supports the wheels, hooks the hooking ring on the rear support connecting rod for connection, and presses the connection by gravity. When separating, the small bicycle and the big bicycle can be separated by lifting the front of the small bicycle without using any tools.

4) The connection point is at the rear connecting shaft of the big bicycle, which does not affect the use of the rear frame of the big bicycle.

5) After the small bicycle is separated from the big bicycle, the folding connecting frame can be folded to reduce the influence on the big bicycle and increase the safety of the big bicycle. After the small bicycle connecting frame is disassembled, the small bicycle connecting frame can be stored in a bag without affecting riding.

6) When the bicycle towing device is not in use, after it can be folded into a direction parallel to the bicycle body, the big bicycle without a rear frame can be converted into a rear frame to realize the loading function.

Generally speaking, the present disclosure is ingenious in conception, compact and reasonable in structure, convenient and quick to install and disassemble, in an unfolded state when in use, folded and placed behind the back seat of the big bicycle when not in use without affecting the functions of carrying people and goods. The overall rotation radius is reduced, and it is convenient and quick to fold and store without affecting riding safety.

BRIEF DESCRIPTION OF THE DRAWINGS

The present disclosure will be further explained with reference to the accompanying drawings hereinafter.

Figure 1:
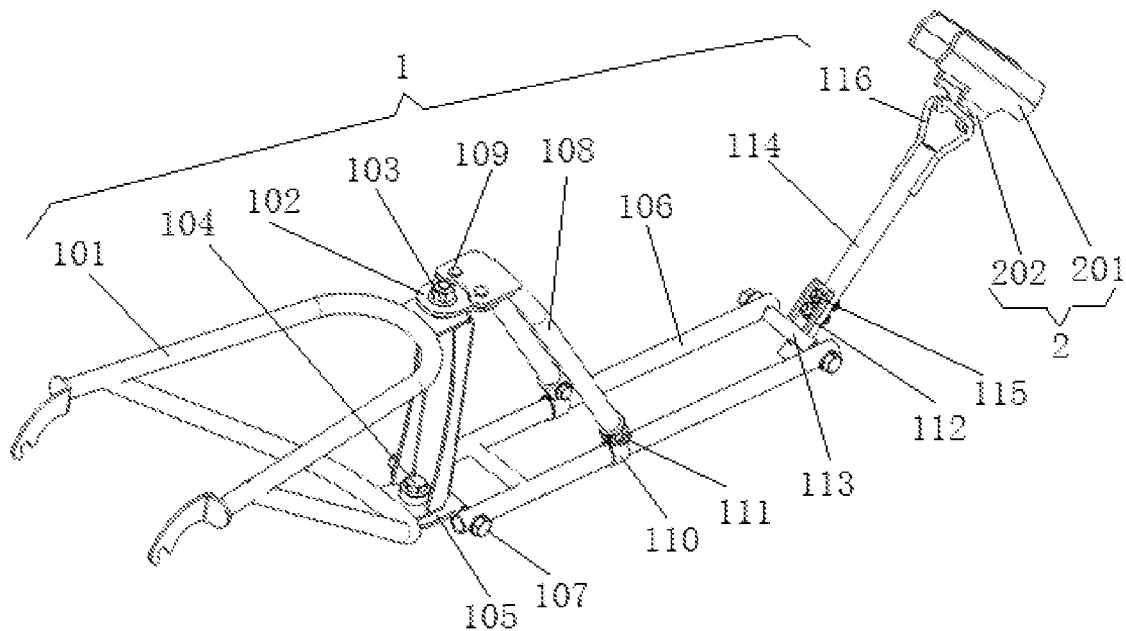
FIG. 1 is a schematic structural diagram of a bicycle towing device according to the present disclosure (unfolded state).

Description of the reference numbers: 1. Folding connecting frame; 101. Front bicycle positioning connecting frame; 102. Upper adapter plate; 103. Fastening nut; 104. Fastening bolt; 105. Lower adapter plate; 106. Intermediate connecting frame; 107. First hinge member; 108. Supporting frame; 109. Connecting screw; 110. Collar; 111. Second hinge member; 112. Rear adapter plate; 113. Third hinge member; 114. Rear support connecting rod; 115. Bolt component; 116. Hooking ring; 117. Clamping arm;

2. Small bicycle connecting frame; 201. Connecting motherboard; 202. Hook; 203. Locking ring;

3. Rear connecting shaft of a big bicycle; 4. Special-shaped nut; 5. Bowl-shaped washer; 6. Inner washer; 7. Small bicycle frame.

DETAILED DESCRIPTION OF THE EMBODIMENTS

As shown in FIGS. 1-7, a bicycle towing device comprises a folding connecting frame 1 and a small bicycle connecting frame 2, wherein the front end of the folding connecting frame 1 is clamped to the rear connecting shaft 3 of a big bicycle and locked and positioned by a fastening component, the rear end of the folding connecting frame 1 is connected with a hook 202 at the front end of the small bicycle connecting frame 2, the rear end of the small bicycle connecting frame 2 is clamped and connected to the small bicycle frame 7, the front wheel of the small bicycle is lapped on the folding connecting frame 1 and positioned motionless without contacting with the ground without connection, the folding connecting frame 1 is provided with a rotating shaft, the rotating shaft is located between the rear wheel of the big bicycle and the front wheel of the small bicycle, and the folding connecting frame 1 is fully unfolded when in operation, and is folded when not in operation.

Figure 2:
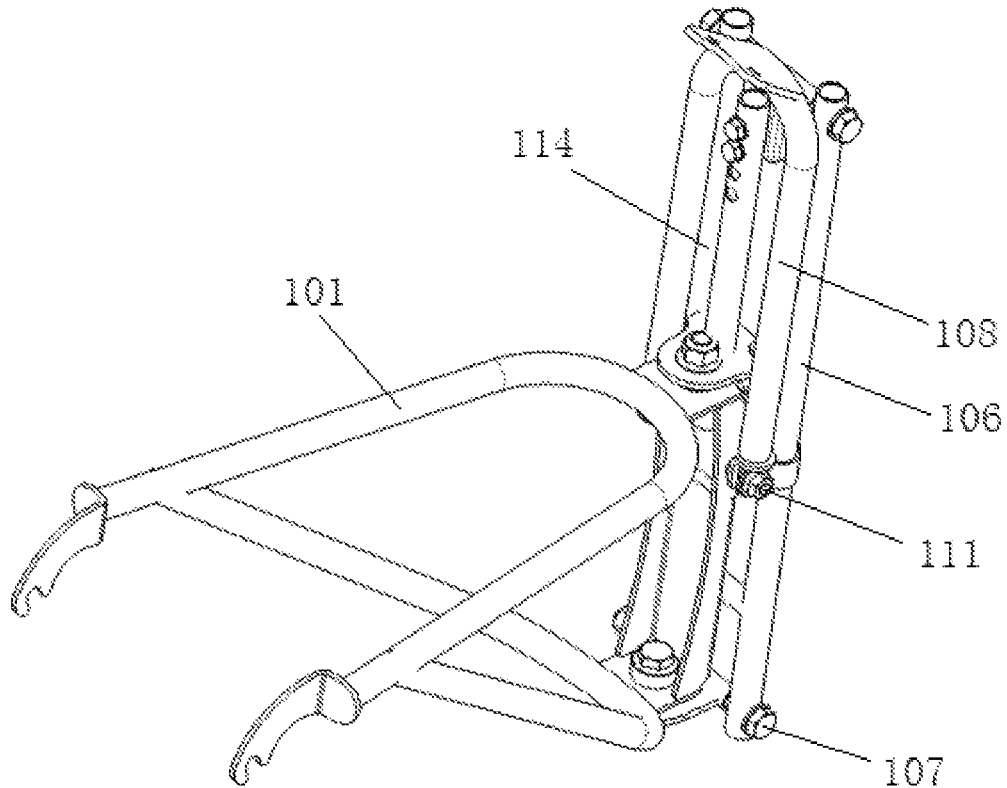
FIG. 2 is a schematic diagram of the folding state of a bicycle towing device according to the present disclosure.

Specifically, as shown in FIGS. 1 and 2, the folding connecting frame 1 comprises a front bicycle positioning connecting frame 101, an intermediate connecting frame 106 and a rear support connecting rod 114, the front end of the front bicycle positioning connecting frame 101 is connected with the rear connecting shaft 3 of the big bicycle, the bottom of the rear end of the front bicycle positioning connecting frame 101 is hinged with the front end of the intermediate connecting frame 106 through a lower adapter plate 105 and a first hinge member 107, the rear end of the intermediate connecting frame 106 is connected with one end of the rear support connecting rod 114 through a rear adapter plate 112 and a third hinge member 113, the other end of the rear support connecting rod 114 is welded with a hooking ring 116, the middle of the intermediate connecting frame 106 is connected with a supporting frame 108, one end of the supporting frame 108 is hinged on the intermediate connecting frame 106 through a collar 110 and a second hinge member 111, and the other end of the supporting frame 108 is connected to the top of the rear end of the front bicycle positioning connecting frame 101 through an upper adapter plate 102.

Specifically, one end of the lower adapter plate 105 is connected to the bottom of the rear end of the front bicycle positioning connecting frame 101 through a fastening bolt 104 and a fastening nut 103. The first hinge member 107 penetrates into the round hole at the other end of the lower adapter plate 105. When folded, the intermediate connecting frame 106 rotates upward by 90 degrees around the first hinge member 107 and is placed in parallel with the vertical plate of the rear end of the front bicycle positioning connecting frame 101. One end of the upper adapter plate 102 is connected to the top of the rear end of the front bicycle positioning connecting frame 101 through a fastening bolt 104 and a fastening nut 103. The top end of the supporting frame 108 is connected to the other end of the upper adapter plate 102 through a connecting screw 109. The collar 110 is sleeved on the intermediate connecting frame 106. The top of the collar 110 is hinged with the bottom of the supporting frame 108 through the second hinge member 111. When the intermediate connecting frame 106 is rotated and folded upwards, the connecting screw 109 is disassembled to separate the supporting frame 108 from the upper adapter plate 102. The supporting frame 108 rotates around the second hinge member 111 and is placed close to the intermediate connecting frame 106 while keeping parallel with the intermediate connecting frame. One end of the rear adapter plate 112 is connected with the bottom of the rear support connecting rod 114 through a bolt component 115. The other end of the rear adapter plate 112 is welded to the third hinge member 113. Both ends of the third hinge member 113 are locked and hinged to the rear end of the intermediate connecting frame 106 through a nut. When not in use, the rear supporting rod 114 is rotated and folded inward around the third hinge member 113, and is in parallel with the intermediate connecting frame 106 after being folded. Specifically, after the folding connecting frame 1 is folded, the intermediate connecting frame 106, the supporting frame 108 and the rear supporting rod 114 are all placed vertically. In addition, both the upper adapter plate 102 and the lower adapter plate 105 are connected to the front bicycle positioning connecting frame 101 through coaxial fastening bolts 104. The intermediate connecting frame 106 can rotate around the axis of the fastening bolt 104. The axis of the fastening bolt 104 is the axis of rotation on the folding connecting frame.

Specifically, the front end of the front bicycle positioning connecting frame is provided with an L-shaped clamping arm 117, the joint of the clamping arm 117 is provided with a U-shaped clamping interface, and the U-shaped clamping interface is clamped to the rear connecting shaft of the big bicycle.

Figure 5:
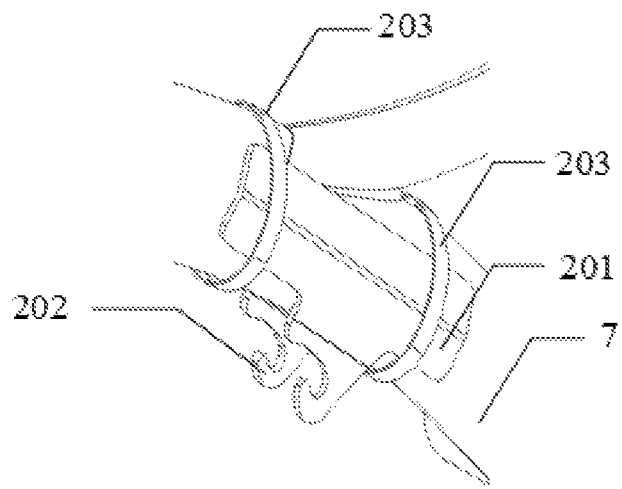
FIG. 5 is a schematic diagram of the connection between the present disclosure and a small bicycle frame.

Specifically, as shown in FIGS. 1 and 5, the small bicycle connecting frame 2 comprises two symmetrically arranged connecting mainboards 201. The hooks 202 are provided at the front end of the connecting mainboards 201. The two connecting mainboards 201 are fastened by locking rings 203 after being buckled on the small bicycle frame 7. The locking rings 203 are sleeved outside the connecting mainboards 201. The hooks 202 are connected with the hooking rings 116. The locking ring is made of an elastic material and into an elastic ring, or is directly locked and positioned by a binding band with a quick clip. When being connected, the front wheel of the small bicycle is embedded on the intermediate connecting frame 106, the rear side of the front wheel of the small bicycle is lapped on the third hinge member 113, and the front side of the front wheel of the small bicycle is lapped on the vertical connecting rod at the front end of the intermediate connecting frame 106.

Figure 3:
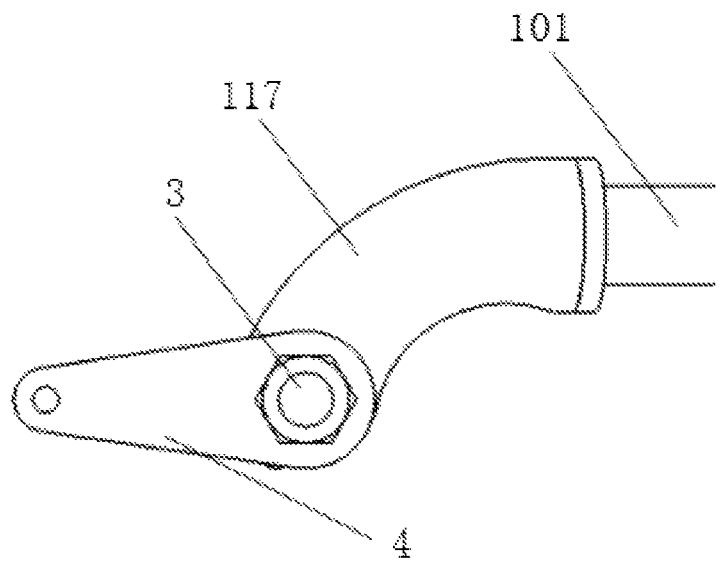
FIG. 3 is a front diagram of the connection between the present disclosure and a big bicycle.
Figure 4:
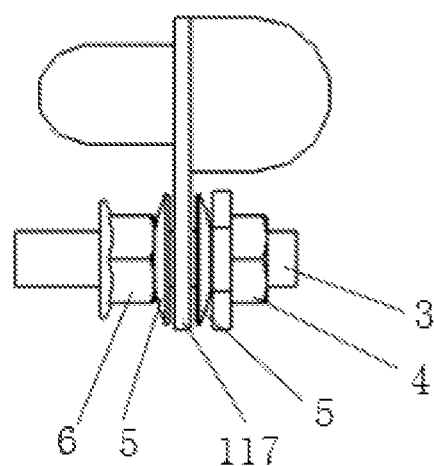
FIG. 4 is a side diagram of the connection between the present disclosure and a big bicycle.

Specifically, as shown in FIGS. 3 and 4, the fastening component comprises a special-shaped nut 4, a bowl-shaped washer 5 and an inner washer 6, bowl-shaped washers 5 are symmetrically arranged on both sides of the U-shaped clamping interface, the inner washer 6 is installed inside the inner bowl-shaped washer, and the special-shaped nut 4 is installed outside the outer bowl-shaped washer and locked on the rear connecting shaft 3 of the big bicycle. Specifically, the special-shaped nut 4 comprises a handle end and a fastening end which are integrally formed, and the fastening end is provided in a nut structure and is screwed on the rear connecting shaft 3 of the big bicycle. The special-shaped nut 4 is used to manually turn the fastening end through the handle end to push the bowl-shaped washer 5 to clamp the clamping arm 117 without using tools, and the bowl-shaped washer 5 is elastically deformed here, so that it can clamp the clamping arm 117 with only a small clamping force. Therefore, the clamping arm will not be separated from the rear connecting shaft 3 of the big bicycle due to bumps during its movement. At the same time, without adjusting the special-shaped nut 4, the clamping arm 117 and the fastening component can rotate around the rear connecting shaft 3 of the big bicycle under the action of general manpower, thus realizing the folding function of the bicycle towing device.

Figure 6:
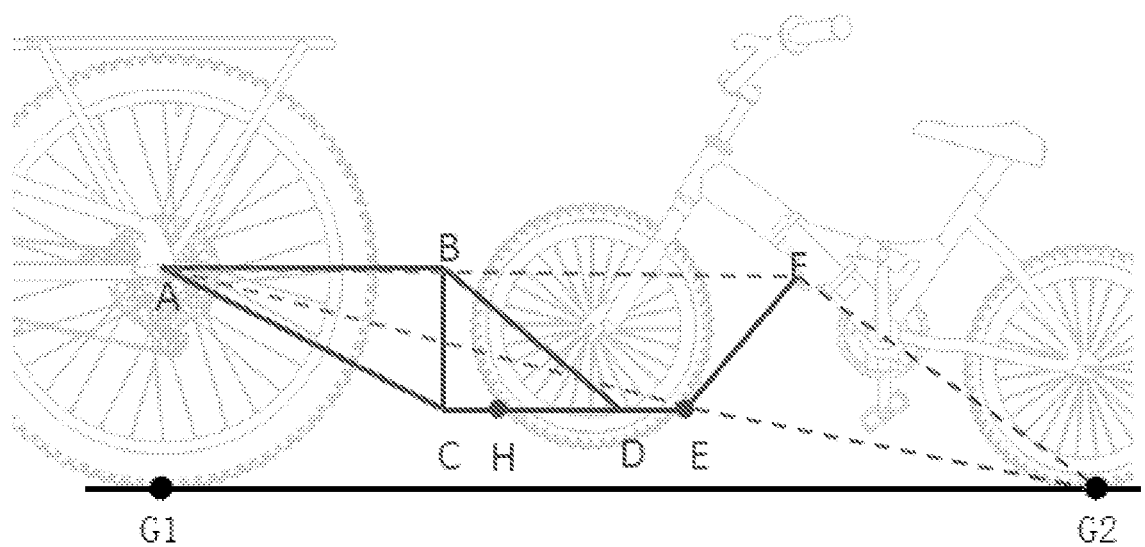
FIG. 6 is a schematic diagram of the connection state during operation according to the present disclosure.

As shown in FIG. 6, the working principle of the present disclosure is as follows.

First, the bicycle towing device of the present disclosure is completely assembled. The front bicycle positioning connecting frame 101, the intermediate connecting frame 106, the rear supporting rod 114 and the supporting frame 108 for positioning are assembled together through a plurality of different hinge members and adapter plates. Then, the clamping arm 117 at the front end of the front bicycle positioning connecting frame 101 is connected with the rear connecting shaft 3 of the big bicycle, and is locked and fixed by fasteners of the special-shaped nut 4, the bowl-shaped washer 5 and the inner washer 6. Thereafter, the two connecting mainboards 201 are buckled on the small bicycle frame 7 and then fastened by the locking ring 203. Finally, the hook 202 is hooked on the hooking ring 116 at the rear end of the folding connecting frame 1, thus realizing the connection between the big bicycle and the small bicycle. The connected state is shown in FIG. 6.

1) Point A is the connection point between the bicycle towing device and the rear connecting shaft 3 of the big bicycle. Points B and C are the connection points of the upper adapter plate and the lower adapter plate. Respectively. Point D is at the position of the second hinge member 111.
2) Point F is the connection point between the bicycle towing device and the small bicycle frame 7.
3) Point H is the horizontal axis on the intermediate connecting frame 106. Point E is at the position of the third hinge member 113. The connected front wheels of the small bicycle are supported and positioned on the horizontal axis at point H and the third hinge member 113, so as to limit the downward movement of the small bicycle wheels relative to points H and E.
4) Points G1 and G2 represent the contact points of big bicycle wheels and small bicycle wheels with the horizontal line of the ground, respectively.

According to the analysis:
1) Three points A, B and C form a triangle, and three points B, C and D form a triangle. The two triangles are connected together to form a whole body rotating around point A. Line segments C and E are extensions of line segments C and D, so as to form a virtual line segment AE, which rotates around point A.
2) The front wheel of the small bicycle is restricted by point H and point E under the action of gravity, so that the included angle ∠AEF between line segment CE and line segment EF will not decrease, and the distance between point A and point F will not decrease again, thus actually forming a triangle ΔAEF that can rotate around point A.
3) As a whole, the small bicycle with its front lifted forms a line segment FG2 that can rotate around the point G2.
4) As mentioned above, the included angle ∠AEF will not decrease, so that the relative distance between point E and point G2 will not change, thus forming a triangle ΔFEG2 that can rotate around point G2.
5) ΔAEF and ΔFEG2 share a line segment EF, so that the two triangles are connected with each other. The distance from point A to point G1 is the fixed radius of the big bicycle wheel. Point G2 has already touched the ground, and ∠G1G2A will not change. Therefore, the front wheel of the small bicycle attached to the combination of point A and point G2 will not move up or down under the action of gravity, so that the front wheel of the small bicycle will be lifted off the ground, and only the rear wheel of the small bicycle will touch the ground. When people on the small bicycle step on the pedal, power can be provided.
6) By reasonably designing the width of the intermediate connecting frame 106 at point H and point E and the width at the axis of point F, the wheel or the frame of the small bicycle is fixed and prevented from moving laterally, so that the small bicycle will be firmly fixed on the bicycle towing device to maintain the stability in the running process. The front wheel of the small bicycle is connected with the front of the small bicycle, so that the front of the small bicycle can no longer rotate.
7) After the big bicycle is turned, the small bicycle can rotate around the axis consisting of point B and point C, and the small bicycle can form a certain angle with the big bicycle. The steering axis of the small bicycle is point BC, instead of the steering axis of the front of the big bicycle, thereby effectively shortening the rotation radius.

Figure 7:
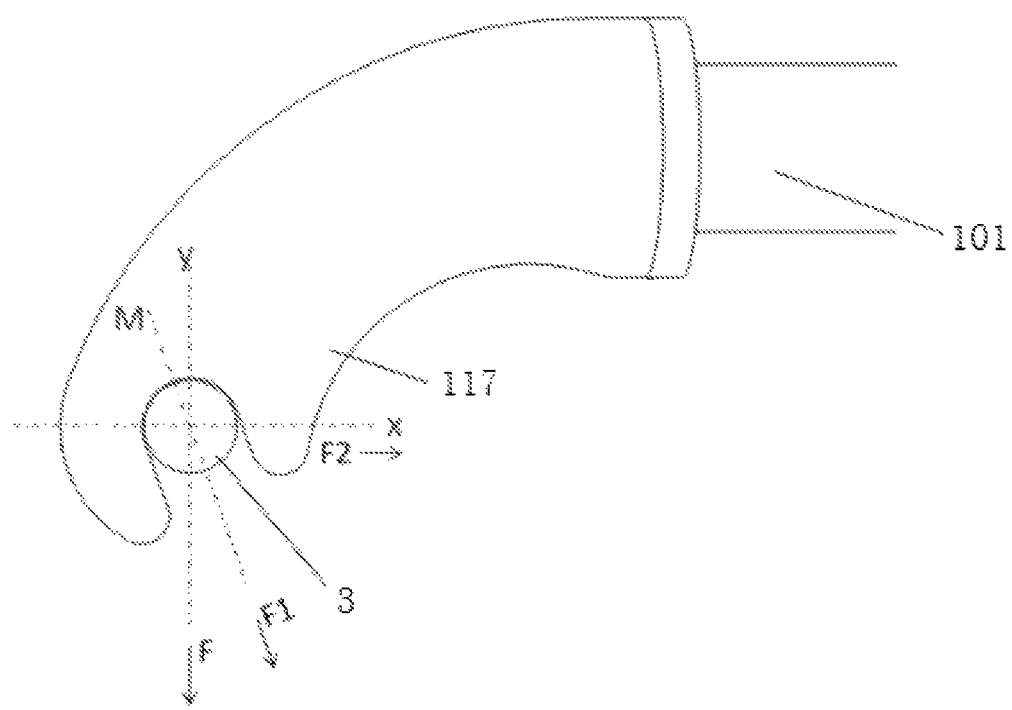
FIG. 7 is a schematic diagram of the positioning principle at a rear connecting shaft of a big bicycle according to the present disclosure.

Specifically, as shown in FIG. 7, it is a schematic diagram of the connection between the clamping arm 117 at the front end of the front bicycle positioning connecting frame 101 and the rear connecting shaft 3 of the big bicycle, in which the dotted line represented by X is parallel to the ground, the dotted line represented by Y is vertical to the ground, and the direction represented by M can be any direction forming an angle of 0-90 degrees with the Y axis (in the second quadrant direction formed by the X axis and the Y axis). The connecting end of the clamping arm 117 comprises an open slot, which consists of a characteristic arc at the bottom of the slot, two adjacent sides of the opening, and two outer arcs at the slot opening.

The two outer arcs are used for guiding when hooking the big bicycle axle, the two sides of the opening are parallel to the M direction and larger than the outer size of the rear connecting shaft 3 of the big bicycle, and the characteristic arc at the bottom of the slot is the arc larger than the rear connecting shaft 3 of the big bicycle, and is smoothly connected with the two sides of the opening.

When the clamping arm 117 is sleeved into the rear connecting shaft 3 of the big bicycle through the open slot, the rear connecting shaft 3 of the big bicycle is defined in the semicircle of the characteristic arc at the bottom of the slot, which will generate a downward force F due to the weight of the big bicycle. However, because the opening direction of the open slot is the M direction, and the forces generated by dragging the small bicycle when the big bicycle moves forward are F1 and F2, respectively, the clamping arm 117 will not fall off upward when it is pressed against the axle.

When the folding connecting frame 1 is in the folded state (parallel to the ground as mentioned above), that is, when the X axis becomes perpendicular to the ground, because the opening is along the M direction, there is a component force F1 of the downward pressure at this time, so that the clamping arm 117 will not fall off from the rear wheel of the big bicycle.

The joint of the clamping arm 117 and the front bicycle positioning connecting frame 101 is a straight arm with a certain distance along the Y axis direction, and it is continuously pulled and transitioned by a large arc. A gap is formed at the large arc to avoid the transmission or other features of some rear wheels of the big bicycle near the rear connecting shaft 3 of the big bicycle.

In addition, the connection points with the big bicycle and the small bicycle specified in the present disclosure can be other points as long as the corresponding functions can be achieved. For example, the axle of the wheel fixed by the small bicycle can also be the front wheel axle of the small bicycle or any part on the steering frame. The tripod point fixed by the small bicycle can also be any part of the tripod or the bicycle body. By local improvement, increasing or decreasing the connection points in the middle of the bicycle towing device can also realize similar functions.

The above embodiments only describe the preferred mode of the present disclosure, and do not limit the scope of the present disclosure. Without departing from the design spirit of the present disclosure, various modifications and improvements made to the technical scheme of the present disclosure by those skilled in the art should fall within the scope of protection determined by the claims of the present disclosure.

What is claimed is:

1. A bicycle towing device, comprising a folding connecting frame and a small bicycle connecting frame, wherein the front end of the folding connecting frame is clamped to the rear connecting shaft of a big bicycle and locked and positioned by a fastening component, the rear end of the folding connecting frame is connected with a hook at the front end of the small bicycle connecting frame, the rear end of the small bicycle connecting frame is clamped and connected to the small bicycle frame, the front wheel of the small bicycle is lapped on the folding connecting frame and positioned motionless without contacting with the ground during connection, the folding connecting frame is provided with a rotating shaft, the rotating shaft is located between the rear wheel of the big bicycle and the front wheel of the small bicycle, and the folding connecting frame is fully unfolded when in operation, and is folded when not in operation, wherein, the folding connecting frame comprises a front bicycle positioning connecting frame, an intermediate connecting frame and a rear support connecting rod, the front end of the front bicycle positioning connecting frame is connected with the rear connecting shaft of the big bicycle, the bottom of the rear end of the front bicycle positioning connecting frame is hinged with the front end of the intermediate connecting frame through a lower adapter plate and a first hinge member, the rear end of the intermediate connecting frame is connected with one end of the rear support connecting rod through a rear adapter plate and a third hinge member, the other end of the rear support connecting rod is welded with a hooking ring, the middle of the intermediate connecting frame is connected with a supporting frame, one end of the supporting frame is hinged on the intermediate connecting frame through a collar and a second hinge member, and the other end of the supporting frame is connected to the top of the rear end of the front bicycle positioning connecting frame through an upper adapter plate.

2. The bicycle towing device according to claim 1, wherein one end of the lower adapter plate is connected to the bottom of the rear end of the front bicycle positioning connecting frame through a fastening bolt and a fastening nut, the first hinge member penetrates into the round hole at the other end of the lower adapter plate, one end of the upper adapter plate is connected to the top of the rear end of the front bicycle positioning connecting frame through a fastening bolt and a fastening nut, the top end of the supporting frame is connected to the other end of the upper adapter plate through a connecting screw, the collar is sleeved on the intermediate connecting frame, the top of the collar is hinged with the bottom of the supporting frame through the second hinge member, one end of the rear adapter plate is connected with the bottom of the rear support connecting rod through a bolt component, the other end of the rear adapter plate is welded to the third hinge member, and both ends of the third hinge member are locked and hinged to the rear end of the intermediate connecting frame through a nut.

3. The bicycle towing device according to claim 1, wherein the front end of the front bicycle positioning connecting frame is provided with an L-shaped clamping arm, the joint of the clamping arm is provided with a U-shaped clamping interface, and the U-shaped clamping interface is clamped to the rear connecting shaft of the big bicycle.

4. The bicycle towing device according to claim 1, wherein the small bicycle connecting frame comprises two symmetrically arranged connecting mainboards, the hooks are provided at the front end of the connecting mainboards, the two connecting mainboards are fastened by locking rings after being buckled on the small bicycle frame, the locking rings are sleeved outside the connecting mainboards, the hooks are connected with the hooking rings; when being connected, the front wheel of the small bicycle is embedded on the intermediate connecting frame, the rear side of the front wheel of the small bicycle is lapped on the third hinge member, and the front side of the front wheel of the small bicycle is lapped on the vertical connecting rod at the front end of the intermediate connecting frame.

5. The bicycle towing device according to claim 4, wherein the locking ring is made of an elastic material and into an elastic ring, or is directly locked and positioned by a binding band with a quick clip.

6. The bicycle towing device according to claim 2, wherein the fastening component comprises a special-shaped nut, a bowl-shaped washer and an inner washer, bowl-shaped washers are symmetrically arranged on both sides of the U-shaped clamping interface, the inner washer is installed inside the inner bowl-shaped washer, and the special-shaped nut is installed outside the outer bowl-shaped washer and locked on the rear connecting shaft of the big bicycle.

* * * * *